US011887324B2

(12) United States Patent
Tan et al.

(10) Patent No.: US 11,887,324 B2
(45) Date of Patent: Jan. 30, 2024

(54) CROSS-MODALITY ACTIVE LEARNING FOR OBJECT DETECTION

(71) Applicant: Motional AD LLC, Boston, MA (US)

(72) Inventors: Kok Seang Tan, Serangoon (SG); Holger Caesar, Singapore (SG); Oscar Olof Beijbom, Santa Monica, CA (US)

(73) Assignee: Motional AD LLC, Boston, MA (US)

( * ) Notice: Subject to any disclaimer, the term of this patent is extended or adjusted under 35 U.S.C. 154(b) by 138 days.

(21) Appl. No.: 17/363,085

(22) Filed: Jun. 30, 2021

(65) Prior Publication Data

US 2023/0005173 A1 Jan. 5, 2023

(51) Int. Cl.
*G06T 7/70* (2017.01)
*G06F 18/21* (2023.01)
*G06T 11/00* (2006.01)

(52) U.S. Cl.
CPC .............. *G06T 7/70* (2017.01); *G06F 18/217* (2023.01); *G06T 11/003* (2013.01); *G06T 2207/20084* (2013.01); *G06T 2207/30261* (2013.01); *G06T 2210/12* (2013.01)

(58) Field of Classification Search
CPC ............. G06T 7/70; G06T 11/003; G06T 2207/20084; G06T 2207/30261; G06T 2210/12; G06F 18/217
USPC ......................................................... 382/104
See application file for complete search history.

(56) References Cited

U.S. PATENT DOCUMENTS

| | | | |
|---|---|---|---|
| 10,984,290 B1* | 4/2021 | Goel | G06N 20/00 |
| 11,205,098 B1* | 12/2021 | Wu | G06T 7/70 |
| 11,380,108 B1* | 7/2022 | Cai | G06N 20/00 |
| 11,450,023 B2* | 9/2022 | Woo | G06V 20/58 |
| 2020/0272854 A1 | 8/2020 | Caesar | |
| 2021/0150230 A1* | 5/2021 | Smolyanskiy | G06V 20/56 |
| 2022/0146277 A1* | 5/2022 | Lambert | G01C 21/3848 |
| 2022/0164602 A1* | 5/2022 | Frtunikj | G06V 20/56 |
| 2022/0188695 A1* | 6/2022 | Zhu | G06N 20/00 |
| 2022/0237414 A1* | 7/2022 | Zhang | A01M 21/00 |
| 2022/0261593 A1* | 8/2022 | Yu | G06N 3/088 |

OTHER PUBLICATIONS

Deep Multi-Modal Object Detection and Semantic Segmentation for Autonomous Driving: Datasets, Methods, and Challenges (Year: 2021).*

(Continued)

*Primary Examiner* — Matthew C Bella
*Assistant Examiner* — Pardis Sohraby
(74) *Attorney, Agent, or Firm* — Fish & Richardson P.C.

(57) ABSTRACT

Among other things, techniques are described for cross-modality active learning for object detection. In an example, a first set of predicted bounding boxes and a second set of predicted bounding boxes is generated. The first set of predicted bounding boxes and the second set of predicted bounding boxes are projected into a same representation. The projections are filtered, wherein predicted bounding boxes satisfying a maximum confidence score are selected for inconsistency calculations. Inconsistencies are calculated across the projected bounding boxes based on filtering the projections. An informative scene is extracted based on the calculated inconsistencies. A first object detection neural network or a second object detection neural network is trained using the informative scenes.

19 Claims, 15 Drawing Sheets

(56) References Cited

OTHER PUBLICATIONS

[No Author Listed], "SAE; Surface Vehicle Recommended Practice, Taxonomy and Definitions for Terms Related to Driving Automation Systems for On-Road Motor Vehicles," SAE International, Sep. 30, 2016, 30 pages.

Lang et al., "Pointpillars: Fast encoders for object detection from point clouds," Proceedings of the IEEE/CVF Conference on Computer Vision and Pattern Recognition, May 2019, 12697-705.

Liu et al., "Ssd: Single shot multibox detector," European Conference on Computer Vision, Oct. 8, 2016, 21-37.

Feng et al., "Deep multi-modal object detection and semantic segmentation for autonomous driving: Datasets, methods, and challenges," IEEE Transactions on Intelligent Transportation Systems, 2020, 22:1341-60.

Feng et al., "Labels Are Not Perfect: Inferring Spatial Uncertainty in Object Detection," IEEE Transactions on Intelligent Transportation Systems, Jul. 2021, 18 pages.

\* cited by examiner

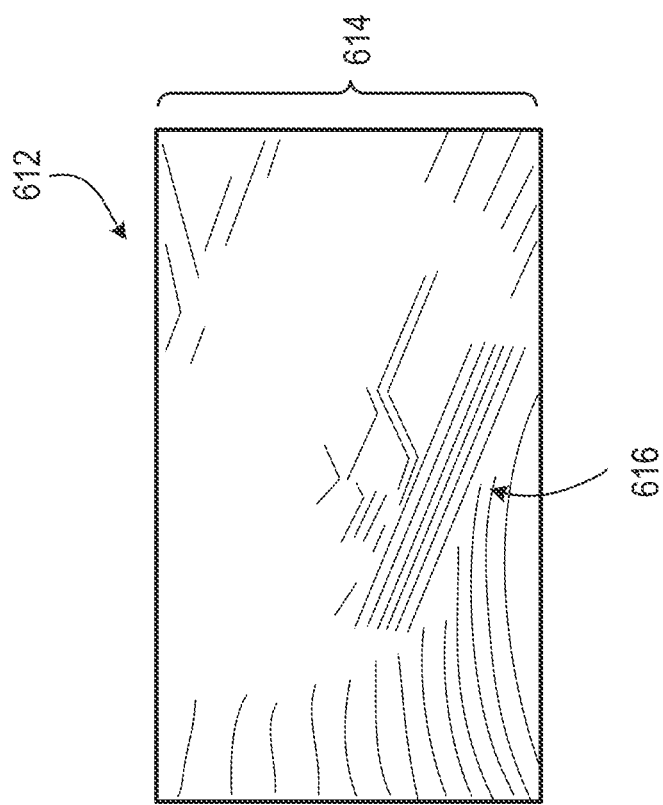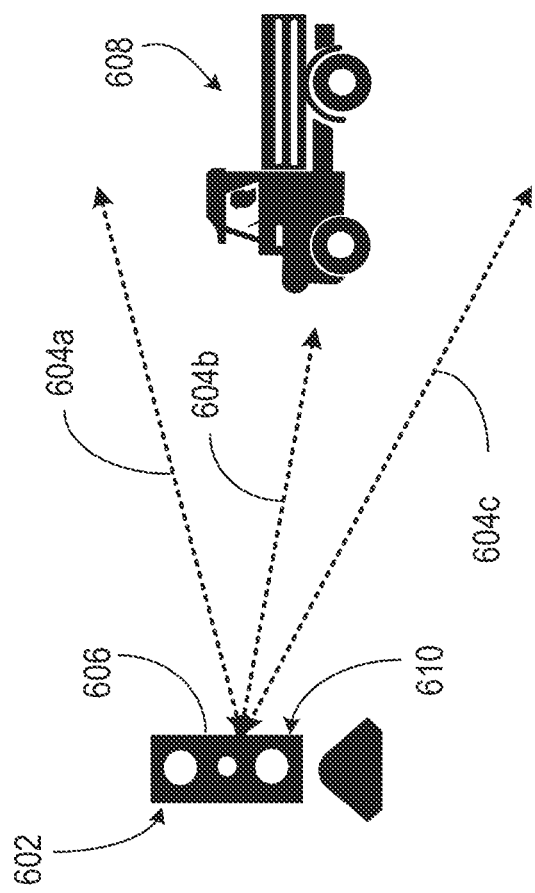
FIG. 6

CROSS-MODALITY ACTIVE LEARNING FOR OBJECT DETECTION

FIELD OF THE INVENTION

This description relates to cross-modality active learning for object detection.

BACKGROUND

Active learning is a form of machine learning in which a system can query a teacher for labels that are applied to new data points. A large amount of unlabeled data is often available, but manual labeling of the data is costly. Through active learning, queries can be issued by the active learning system to obtain labels for the data. Thus, active learning is an iterative supervised leaning technique where input data is analyzed and labeled according to an inferred function, and the inferred function is used to label new data.

BRIEF DESCRIPTION OF THE DRAWINGS

FIG. 6 shows an example of a LiDAR system.

DETAILED DESCRIPTION

Figure 1:
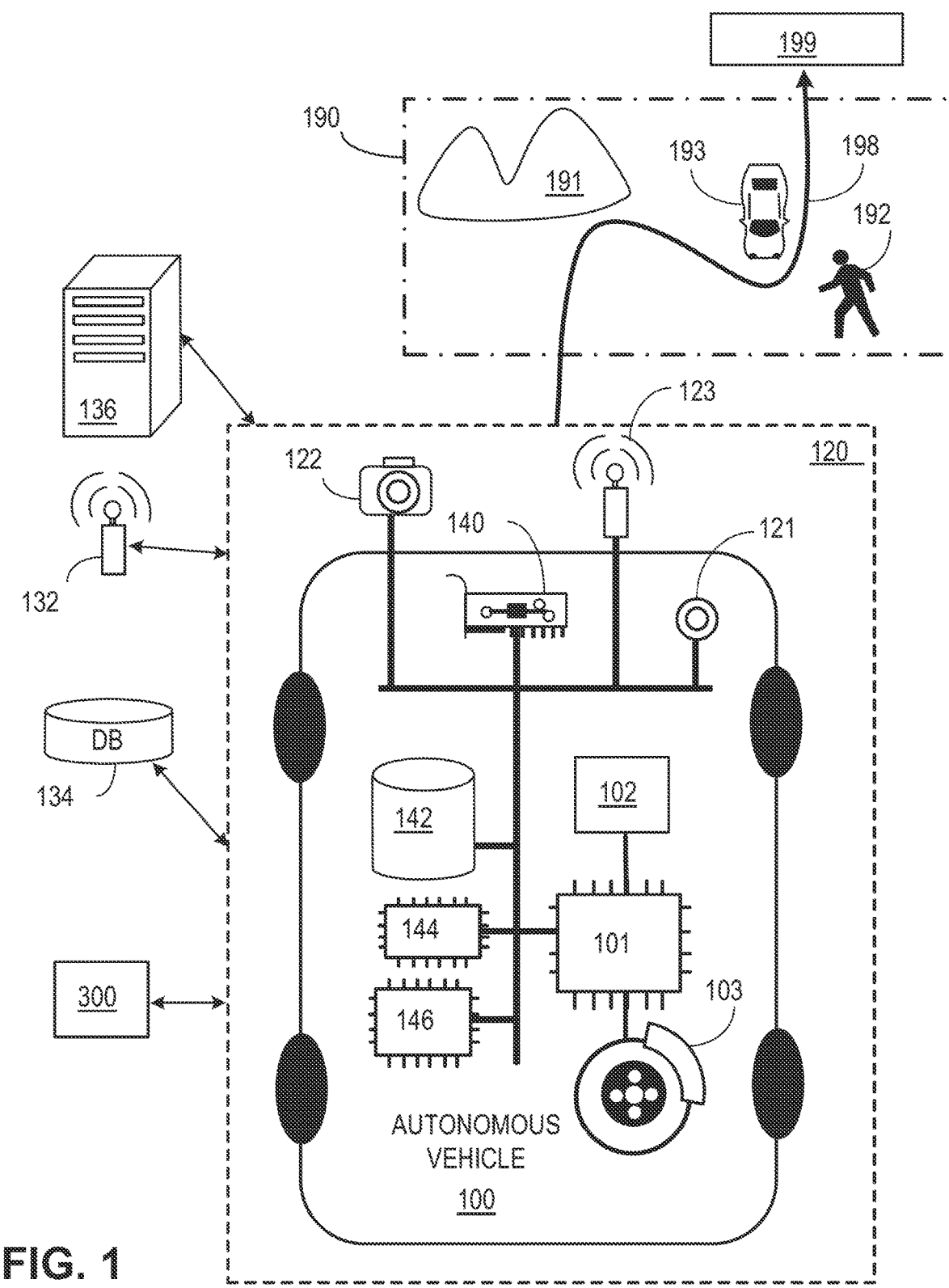
FIG. 1 shows an example of an autonomous vehicle (AV) having autonomous capability.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Inputs
5. AV Planning
6. AV Control
7. System for Cross Modality Active Learning
8. Process for Cross Modality Active Learning

General Overview

A vehicle (such as an autonomous vehicle) typically has multiple sensors mounted at various locations on the vehicle. Data from these sensors is used for object detection. In object detection, sensor data is analyzed to label the sensor data with confidence scores that indicate the presence of a particular object class instance within an area of the data captured by a sensor. For example, the sensor data is be divided into one or more dimensional bounding boxes, and each box is labeled with the likelihood that the bounding box contains a particular class of object. The objects include, but are not limited to, a pedestrian, vehicle, bike, and the like. Active learning is implemented across a plurality of sensor modalities to determine informative data output by object detection techniques. Cross-modality inconsistencies in the output data are computed, and an inconsistency across modalities is used to identify the captured scene as an informative scene. The inconsistencies are weighted in accordance with the known strengths and weaknesses of the respective modality.

Some of the advantages of these techniques include the generic implementation of a black box approach to determining which scenes are informative scenes and which scenes are not. The present techniques can be used as a compliment to existing engineered efforts in crash detection, generic object detection, anomaly detection, and sensor fault detection. Moreover, the present techniques include any network that performs two dimensional (2D) or three dimensional (3D) object detection, including but not limited to camera, radar, and LiDAR object detection networks. By virtue of the implementation of the systems and techniques described herein, datasets can be made more informative and, as a result, the systems they are used in can be operated more efficiently.

System Overview

FIG. 1 shows an example of an AV having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Some embodiments of the present disclosure are described herein in connection with a threshold. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
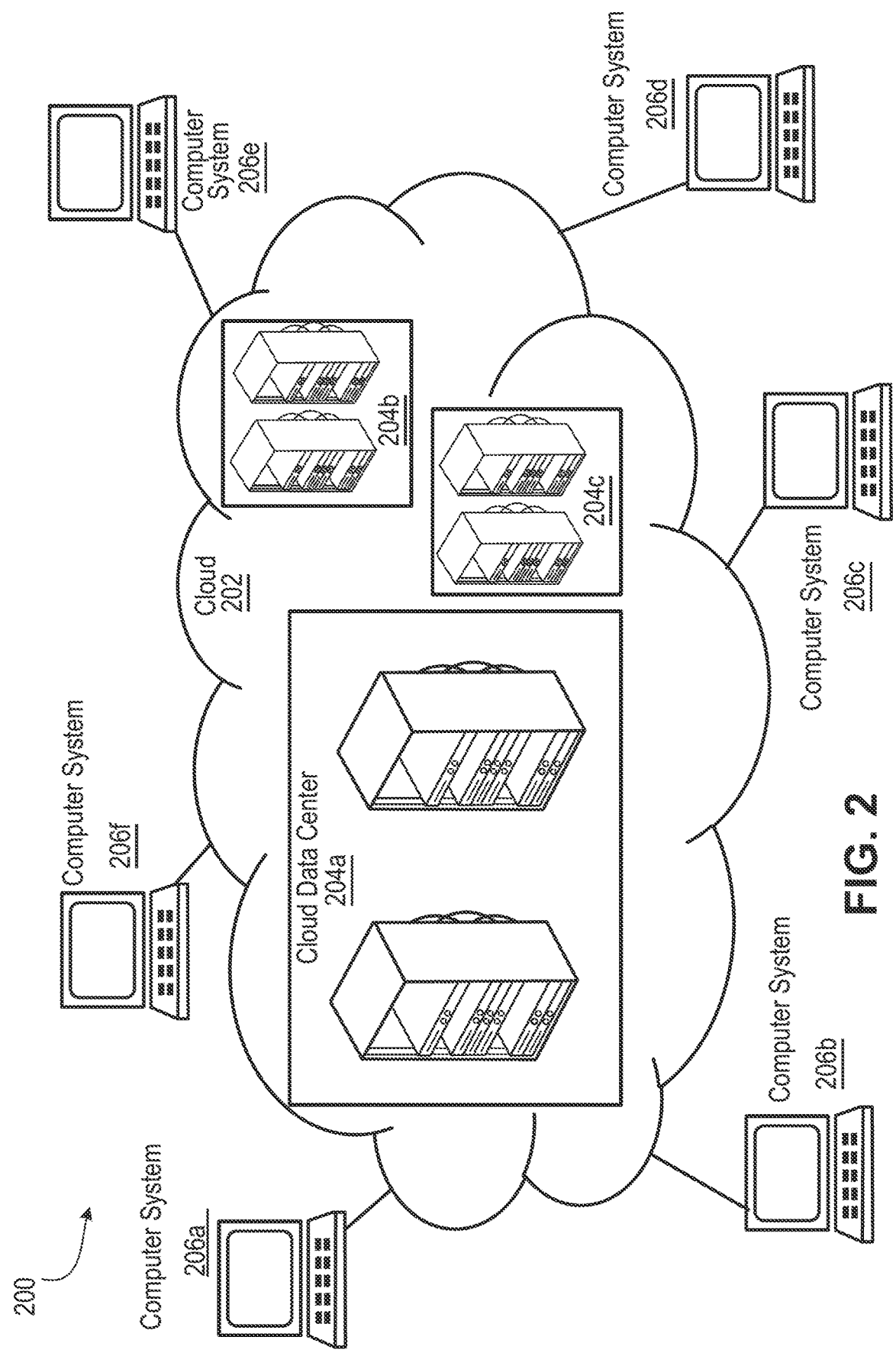
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
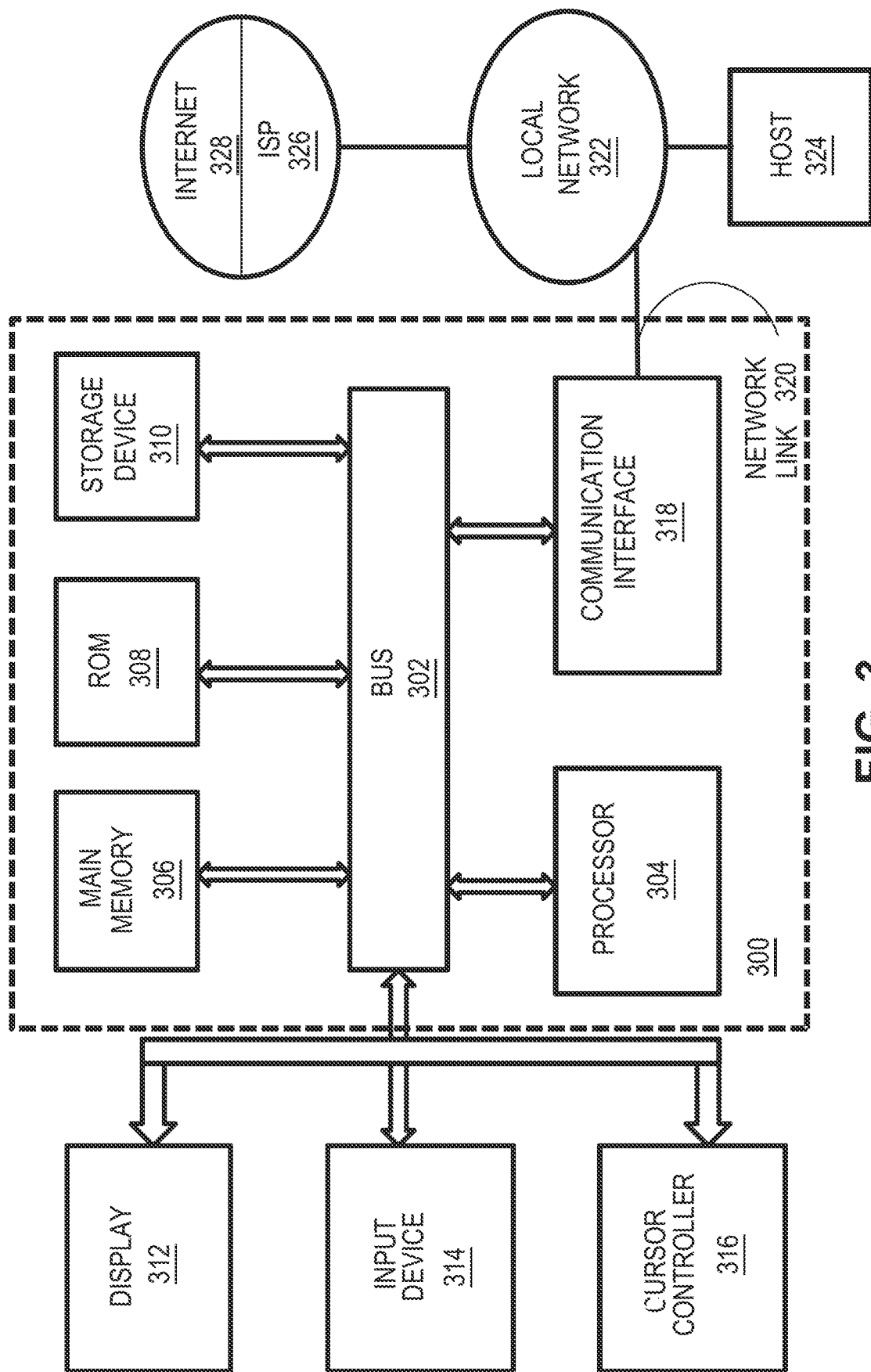
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310.

Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
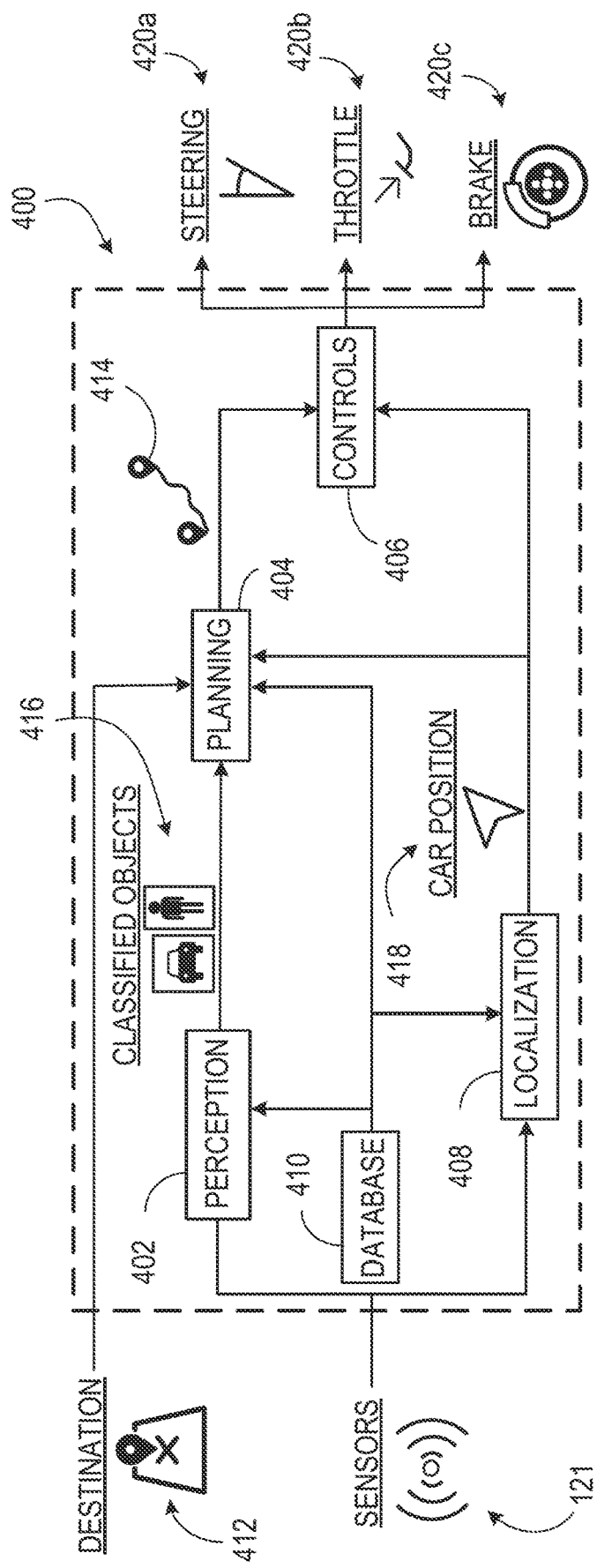
FIG. 4 shows an example architecture for an AV.

FIG. 4 shows an example architecture 400 for an AV (e.g., the vehicle 100 shown in FIG. 1). The architecture 400 includes a perception system 402 (sometimes referred to as a perception circuit), a planning system 404 (sometimes referred to as a planning circuit), a control system 406 (sometimes referred to as a control circuit), a localization system 408 (sometimes referred to as a localization circuit), and a database system 410 (sometimes referred to as a database circuit). Each system plays a role in the operation of the vehicle 100. Together, the systems 402, 404, 406, 408, and 410 can be part of the AV system 120 shown in FIG. 1. In some embodiments, any of the systems 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the systems 402, 404, 406, 408, and 410 is sometimes referred to as a processing circuit (e.g., computer hardware, computer software, or a combination of the two). A combination of any or all of the systems 402, 404, 406, 408, and 410 is also an example of a processing circuit.

In use, the planning system 404 receives data representing a destination 412 and determines data representing a trajectory 414 (sometimes referred to as a route) that can be traveled by the vehicle 100 to reach (e.g., arrive at) the destination 412. In order for the planning system 404 to determine the data representing the trajectory 414, the planning system 404 receives data from the perception system 402, the localization system 408, and the database system 410.

The perception system 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning system 404.

The planning system 404 also receives data representing the AV position 418 from the localization system 408. The localization system 408 determines the AV position by using data from the sensors 121 and data from the database system 410 (e.g., a geographic data) to calculate a position. For example, the localization system 408 uses data from a GNSS (Global Navigation Satellite System) sensor and geographic data to calculate a longitude and latitude of the AV. In an embodiment, data used by the localization system 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control system 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

AV Inputs

Figure 5:
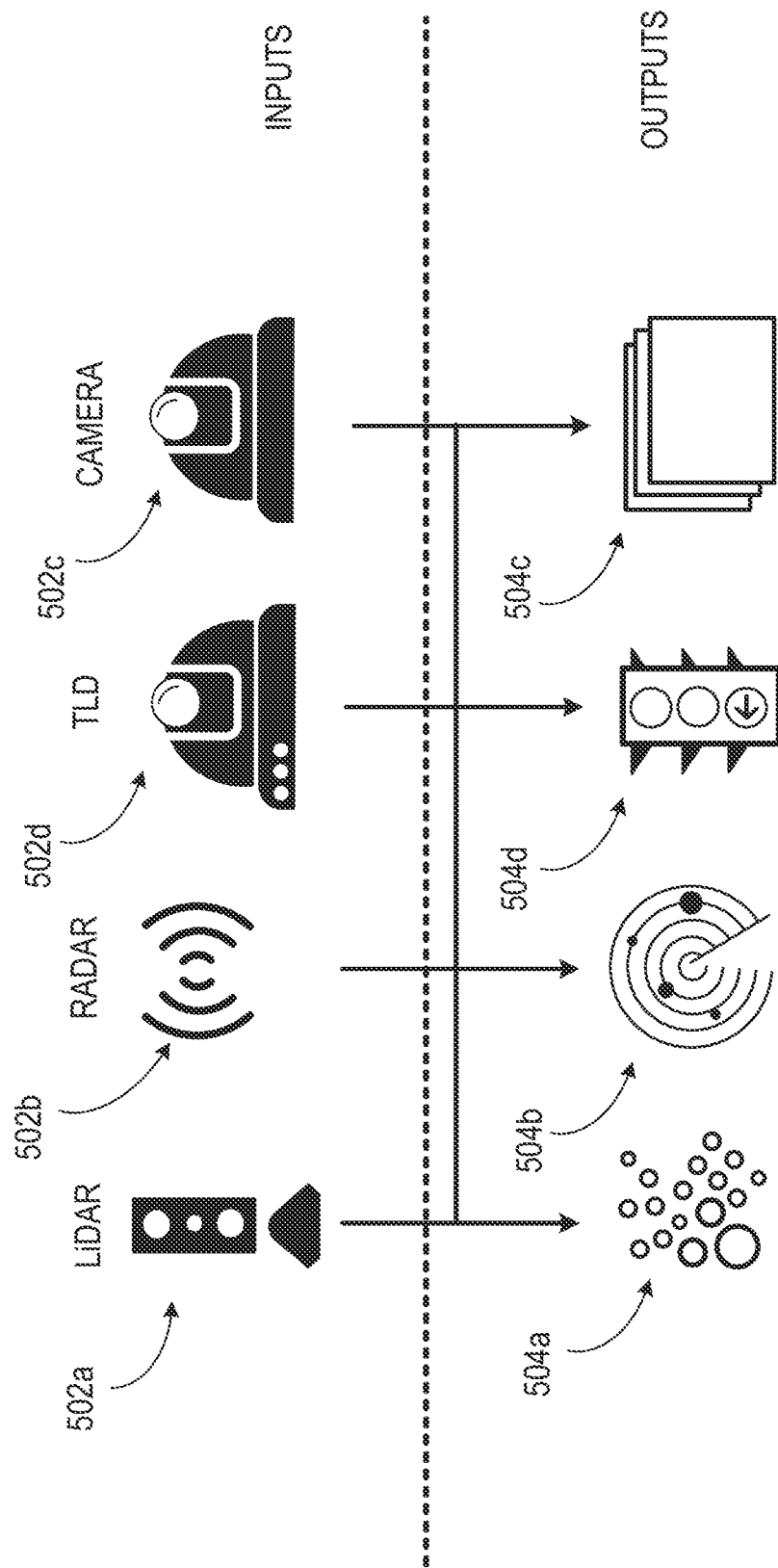
FIG. 5 shows an example of inputs and outputs that can be used by a perception system.

FIG. 5 shows an example of inputs 502a-d (e.g., sensors 121 shown in FIG. 1) and outputs 504a-d (e.g., sensor data) that is used by the perception system 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning system 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
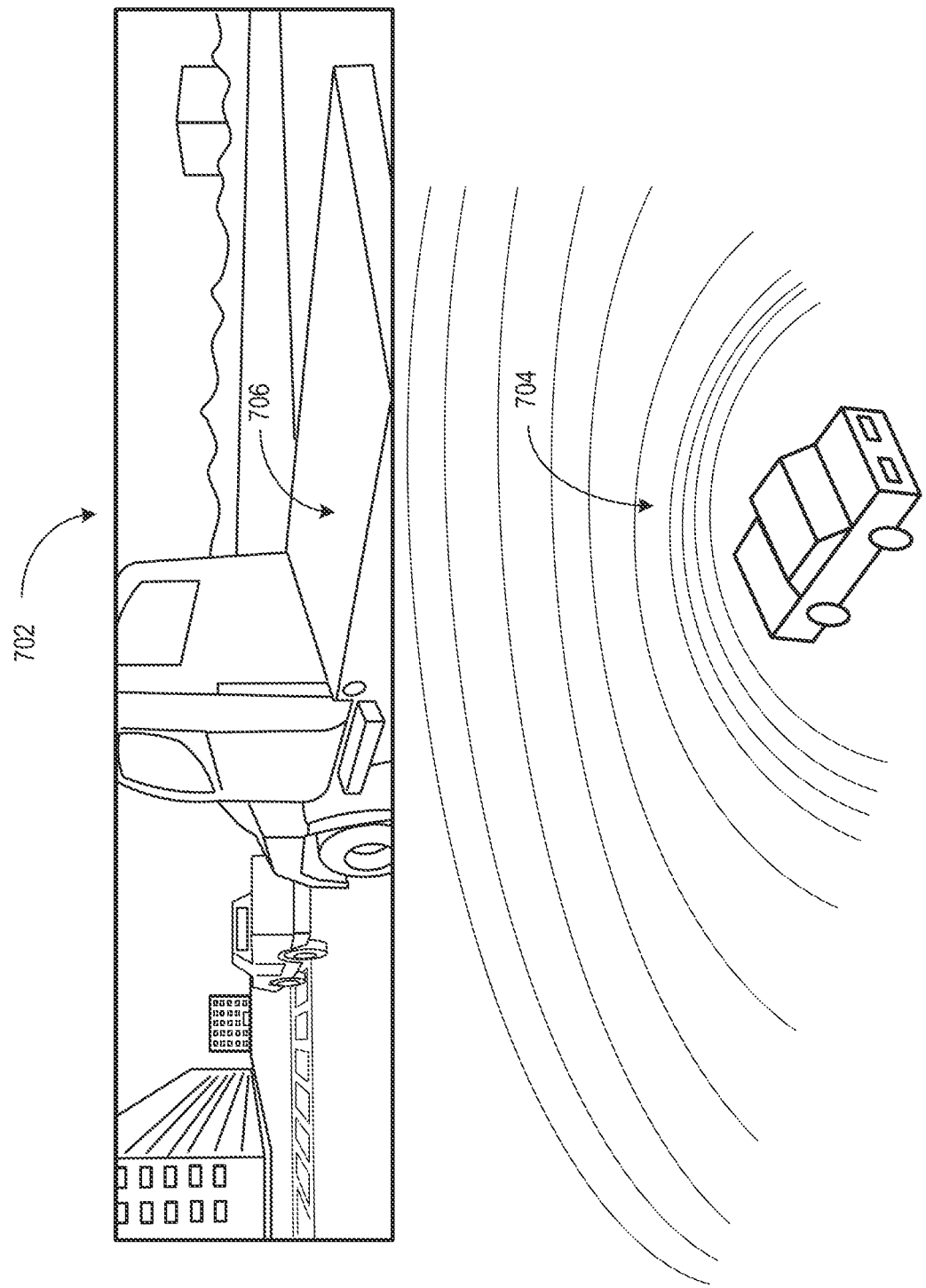
FIG. 7 shows the LiDAR system in operation.

FIG. 7 shows the LiDAR system 602 in operation. In the scenario shown in this figure, the vehicle 100 receives both camera system output 504c in the form of an image 702 and LiDAR system output 504a in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
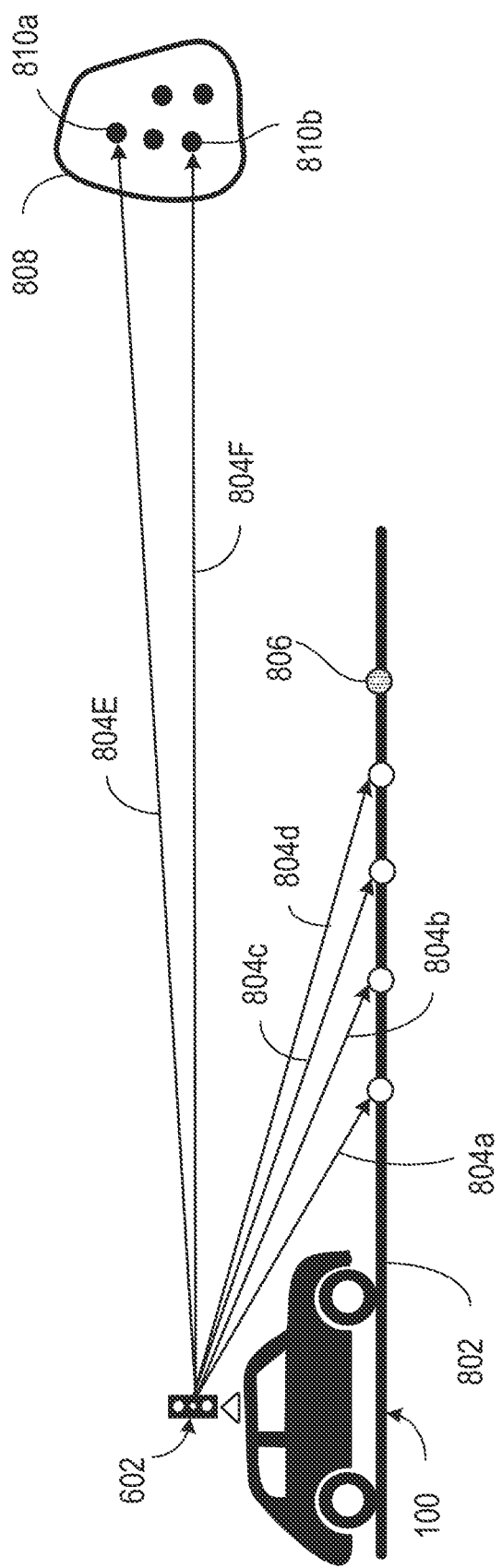
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the vehicle 100 can determine that the object 808 is present.

Path Planning

Figure 9:
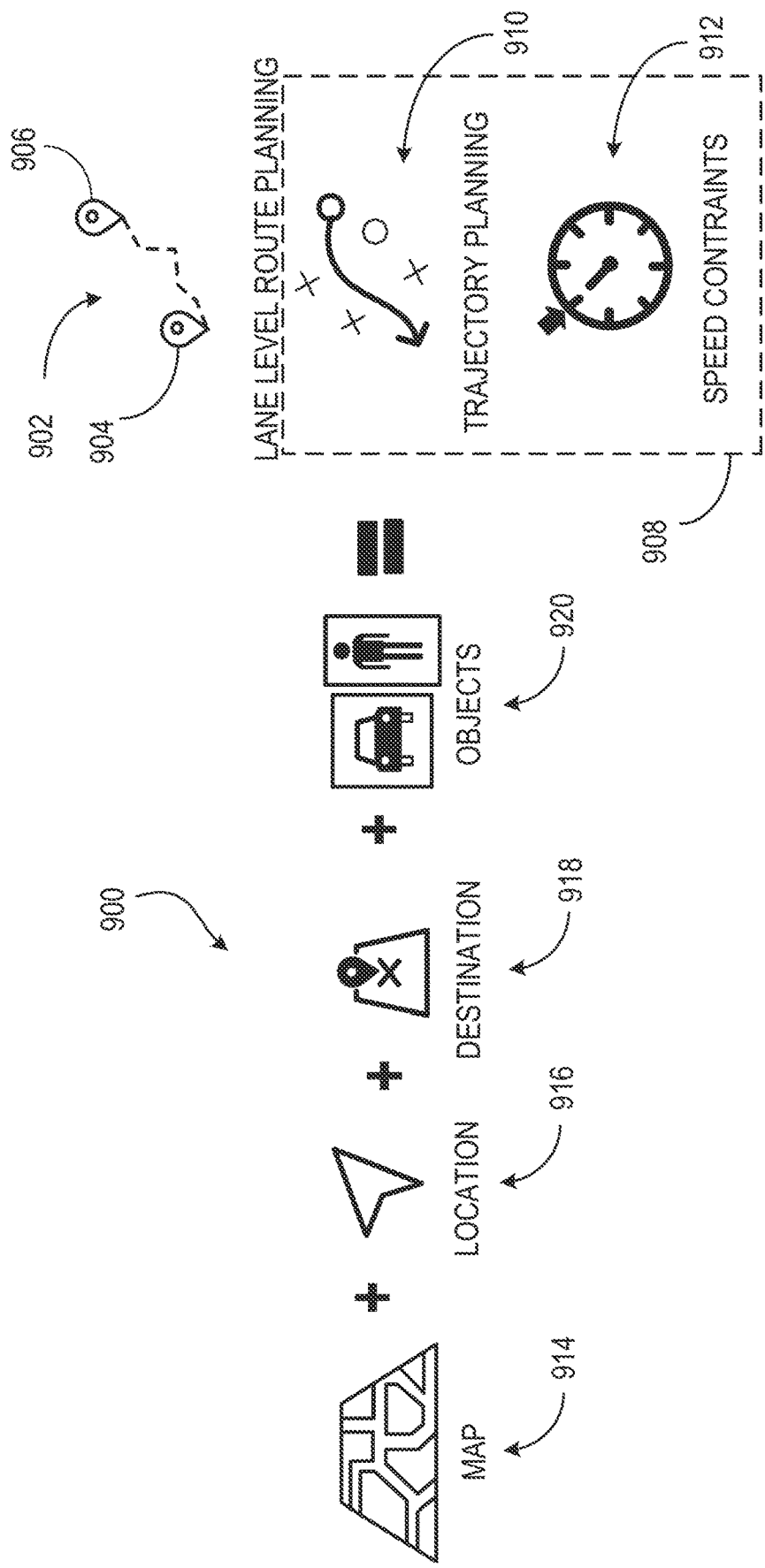
FIG. 9 shows a block diagram of the relationships between inputs and outputs of a planning system.

FIG. 9 shows a block diagram 900 of the relationships between inputs and outputs of a planning system 404 (e.g., as shown in FIG. 4). In general, the output of a planning system 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning system also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning system 404 includes database data 914 (e.g., from the database system 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception system 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
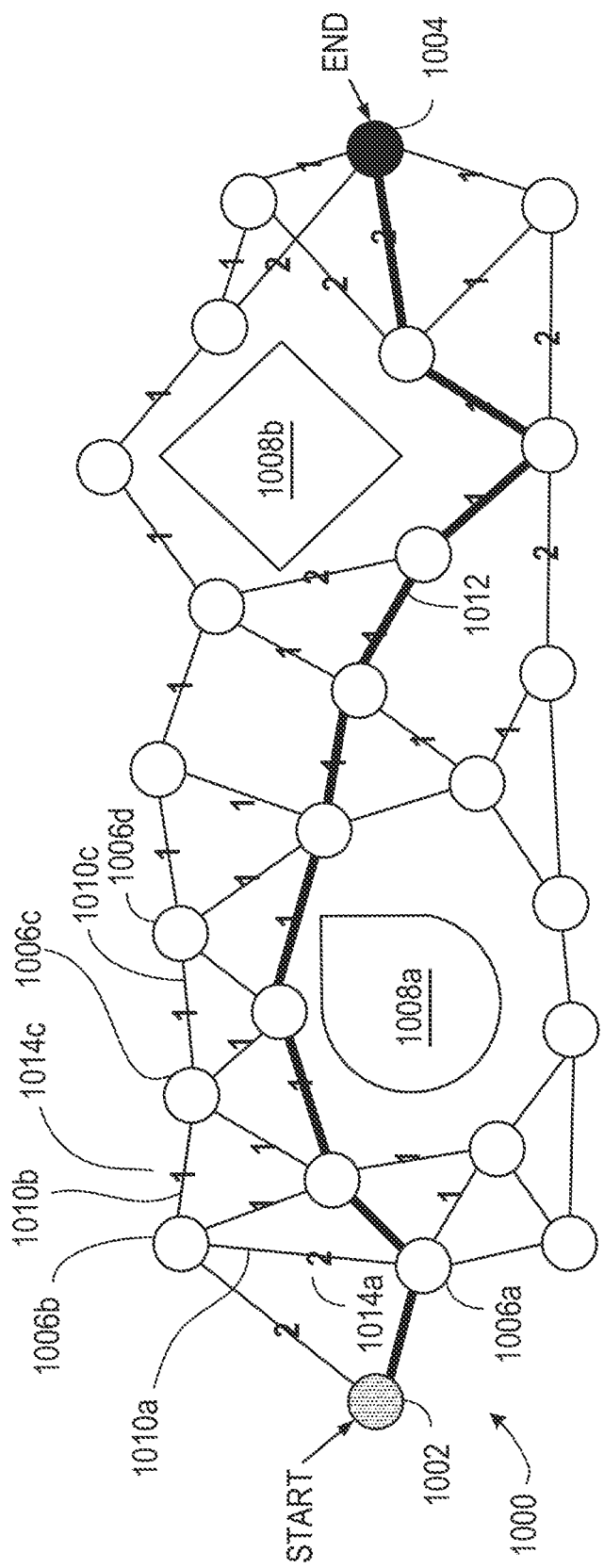
FIG. 10 shows a directed graph used in path planning.

FIG. 10 shows a directed graph 1000 used in path planning, e.g., by the planning system 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by a vehicle 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the vehicle 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the vehicle 100, e.g., other automobiles, pedestrians, or other entities with which the vehicle 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for a vehicle 100 to travel between one node 1006a and the other node 1006b, e.g., without having to travel to an intermediate node before arriving at the other node 1006b. (When we refer to a vehicle 100 traveling between nodes, we mean that the vehicle 100 travels between the two physical positions represented by the respective nodes.) The edges 1010a-c are often bidirectional, in the sense that a vehicle 100 travels from a first node to a second node, or from the second node to the first node. In an embodiment, edges 1010a-c are unidirectional, in the sense that an vehicle 100 can travel from a first node to a second node, however the vehicle 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning system 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the vehicle 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning system 404 identifies a path 1012 between the start point 1002 and end point 1004, the planning system 404 typically chooses a path optimized for cost, e.g., the path that has the least total cost when the individual costs of the edges are added together.

AV Control

Figure 11:
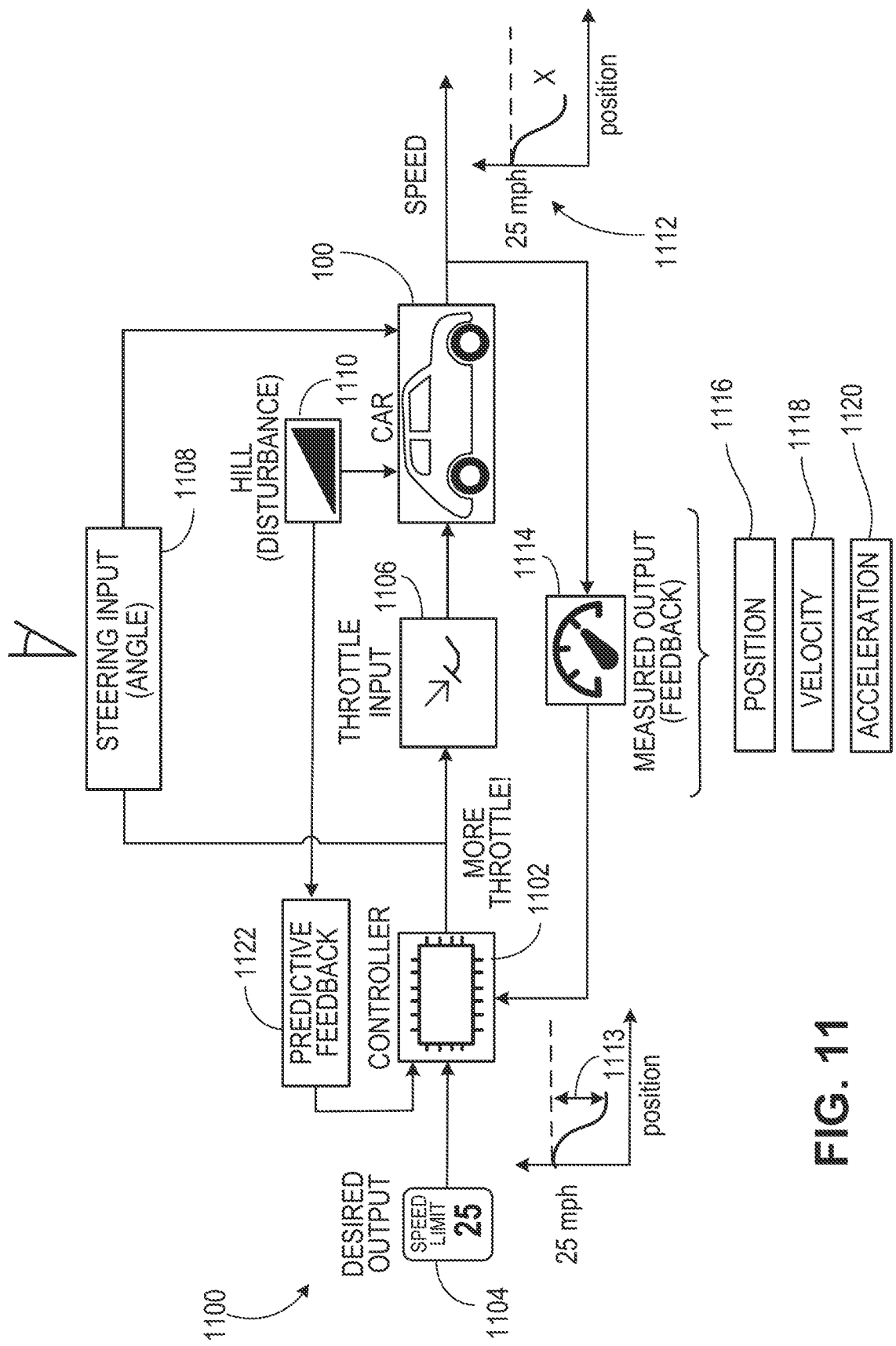
FIG. 11 shows a block diagram of the inputs and outputs of a control system.

FIG. 11 shows a block diagram 1100 of the inputs and outputs of a control system 406 (e.g., as shown in FIG. 4).

A control system operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning system 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an vehicle 100, e.g., by engaging the steering pedal, or engaging another throttle control, to achieve the desired output 1104. In some examples, the throttle input 1106 also includes data usable to engage the brake (e.g., deceleration control) of the vehicle 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the vehicle 100 encounters a disturbance 1110, such as a hill, the measured speed 1112 of the vehicle 100 is lowered below the desired output speed. In an embodiment, any measured output 1114 is provided to the controller 1102 so that the necessary adjustments are performed, e.g., based on the differential 1113 between the measured speed and desired output. The measured output 1114 includes a measured position 1116, a measured velocity 1118 (including speed and heading), a measured acceleration 1120, and other outputs measurable by sensors of the vehicle 100.

In an embodiment, information about the disturbance 1110 is detected in advance, e.g., by a sensor such as a camera or LiDAR sensor, and provided to a predictive feedback system 1122. The predictive feedback system 1122 then provides information to the controller 1102 that the controller 1102 can use to adjust accordingly. For example, if the sensors of the vehicle 100 detect ("see") a hill, this information can be used by the controller 1102 to prepare to engage the throttle at the appropriate time to avoid significant deceleration.

Figure 12:
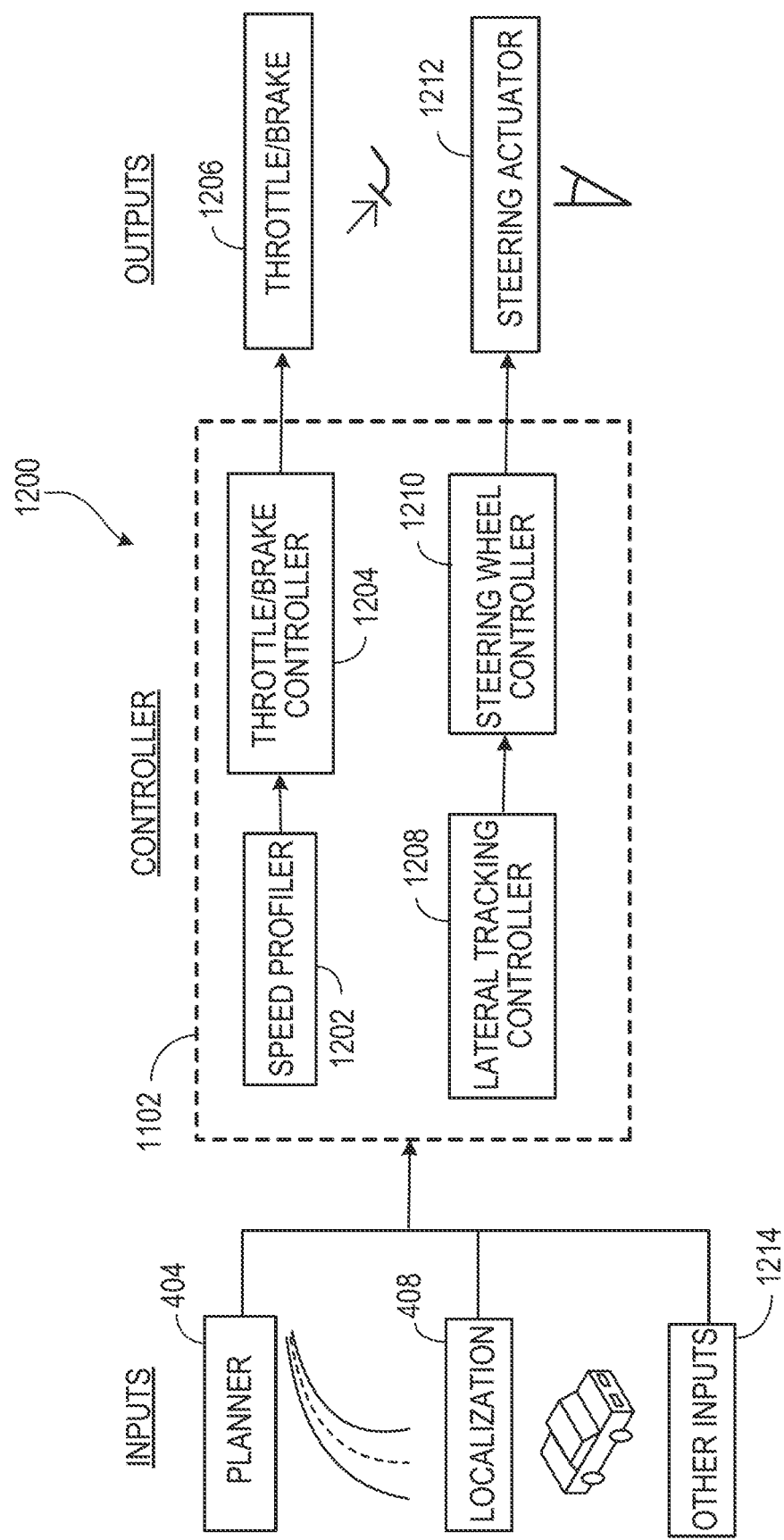
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning system 404 provides information used by the controller 1102, for example, to choose a heading when the vehicle 100 begins operation and to determine which road segment to traverse when the vehicle 100 reaches an intersection. A localization system 408 provides information to the controller 1102 describing the current location of the vehicle 100, for example, so that the controller 1102 can determine if the vehicle 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

System for Cross Modality Active Learning

Figure 13:
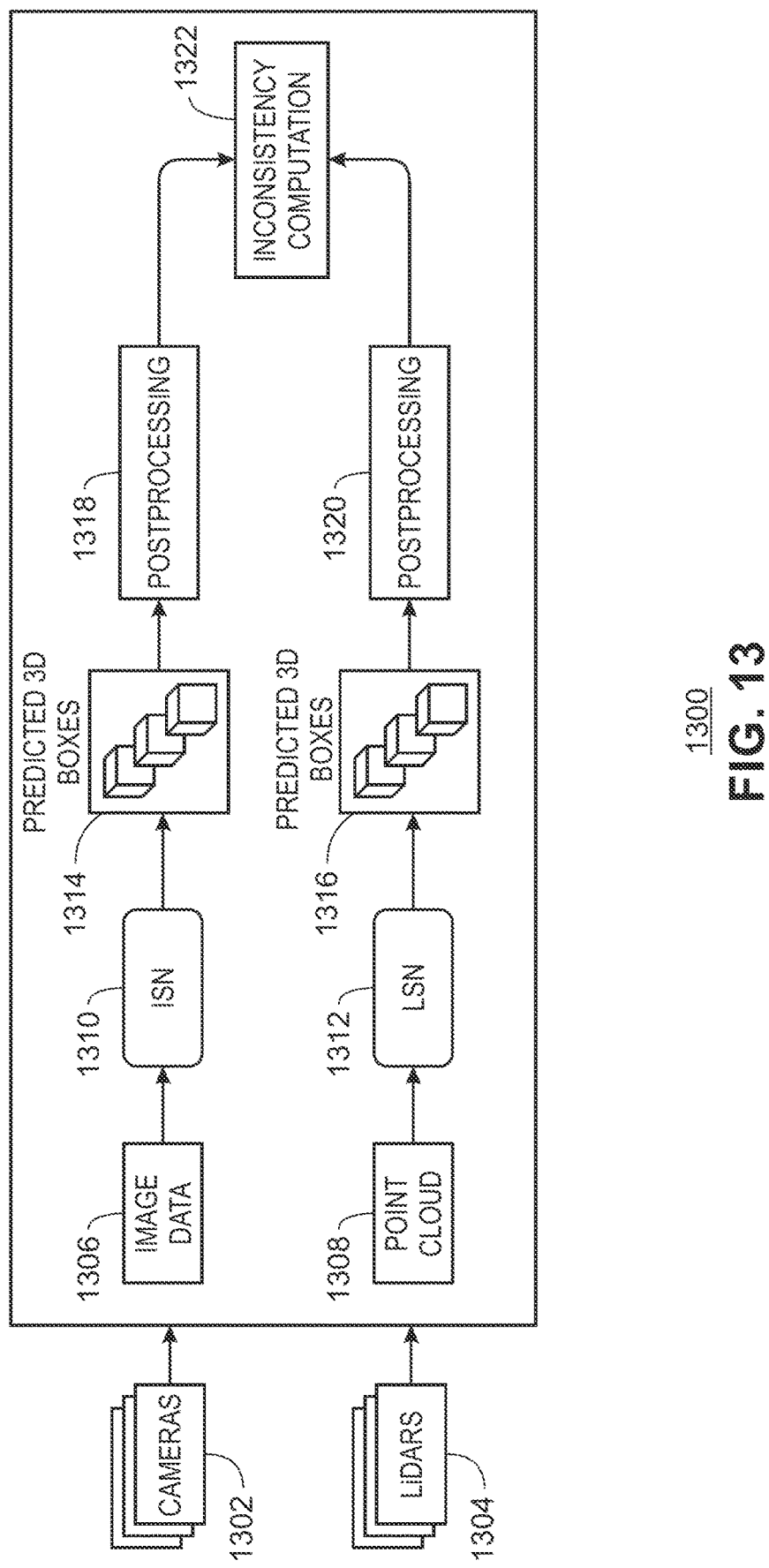
FIG. 13 is a system 1300 that enables cross modality active learning for object detection.

FIG. 13 is a system 1300 that enables cross modality active learning for object detection. In the system 1300, active learning is implemented across a plurality of sensor modalities to determine data that is informative. A vehicle (e.g., vehicle 100 of FIG. 1) can record large amounts of data through a plurality of sensors (e.g., sensor 121 of FIG. 1). However, data storage space is finite and often limited. The active learning techniques described herein reduce the data being stored to informative data, enabling a reduction in the data storage space required while providing high quality data that is utilized to improve other vehicle functionality, such as crash detection, generic object detection, sensor fault detection, and so forth. Moreover, the reduction in data storage enables the present techniques to execute using vehicle hardware as opposed to dedicated servers in a datacenter.

The system 1300 (e.g., system 120 of FIG. 1) includes at least one camera 1302 (e.g., camera 122 of FIG. 1) and at least one LiDAR 1304 (e.g., LiDAR 123 of FIG. 1). The camera 1302 outputs image data 1306 in the form of an image in an image format, such as RAW, JPEG, PNG (e.g., output 504c of FIG. 5). The LiDAR 1304 outputs LiDAR data in the form of a point cloud 1308 (e.g., output 504a of FIG. 5). The at least one camera 1302 and the at least one LiDAR 1304 are components of a perception system, such as the perception system 402 (FIG. 4). Accordingly, the camera 1302 and the LiDAR 1304 output data that identifies objects to be classified (e.g., classified objects 416 of FIG. 4), such as a pedestrian, bicycle, automobile, traffic sign, and the like. For ease of explanation, particular sensor modalities such as camera, LiDAR, and radar are described in accordance with the present techniques. However, the present techniques may be implemented via any sensor modality with that captures data that is analyzed for object detection.

The image data 1306 generally provides accurate measurements of edges, color, and lighting, which ultimately yields accurate object classification and localization (e.g., as determined by localization system 408) on the image plane. However, 3D localization is often inaccurate when based solely on camera data. The point cloud 1308 typically contains less semantic information when compared to image data, and instead enables highly accurate 3D localization. Point clouds are generally sparse, and the range of point clouds is typically limited to 50-100 meters (m). The present techniques leverage the strengths of a plurality of sensor modalities to enable robust object detection across sensor modalities.

The system 1300 includes two object detection networks, an image semantic segmentation network (ISN) 1310 and a LiDAR semantic segmentation network (LSN) 1312. Generally, an object detection neural network is configured to receive sensor data and process the sensor data to detect at least one object (e.g., natural obstructions 191, vehicles 193, pedestrians 192, of FIG. 1; cyclists, and other obstacles) in the 3D space surrounding the sensor. In an embodiment, an object detection neural network is a feed-forward convolutional neural network that, given the outputs 504a-d (e.g., sensor data), generates a set of bounding boxes for potential objects in the 3D space and confidence scores for the presence of object class instances (e.g., cars, pedestrians, or bikes) within the bounding boxes. The higher the classification score, the more likely the corresponding object class instance is present in a box. An example object detection neural network is described in detail in W. Liu, D. Anguelov, D. Erhan, C. Szegedy, S. Reed, C. Y. Fu, and A. C. Berg. SSD: Single Shot Multibox Detector. Springer, 201, available at https://arxiv.org/pdf/1512.02325.pdf.

The ISN 1310 takes as input image data 1306 and outputs a set of predicted 3D bounding boxes 1314 for potential objects in the 3D space and corresponding confidence scores for the presence of object class instances within the bounding boxes. The 3D bounding boxes include information about the dimension, orientation and location of a 3D bounding box for the object in a format that can be projected a same data representation as described below. In particular, the ISN 1310 takes as input a set of images, predicts the class of each pixel in the images and outputs semantic segmentation data (e.g., a confidence score) for each pixel in the image. The ISN 1310 is trained using an image dataset that includes images where each image is augmented with bounding boxes and segmentation labels for classes in the image dataset. An example confidence score is a probability value that indicates the probability that the class of the pixel was correctly predicted.

Similarly, the LSN 1312 takes as input at least one point cloud 1308 and outputs a set of predicted 3D bounding boxes 1316 for potential objects in the 3D space and confidence scores for the presence of object class instances within the bounding boxes. In an example, the LSN receives a plurality of data points that represent the 3D space. For example, each data point of the plurality of data points is a set of 3D spatial coordinates (e.g., x, y, z coordinates). The data is encoded into pillars and outputs a pseudo image, as described in "PointPillars: Fast Encoders for Object Detection from Point Clouds," arXiv:1812.05784v2 [cs.LG] 7 May 2019. Generally, a pillar encoder takes as input one or more point clouds and estimates oriented 3D bounding boxes for cars, pedestrians and cyclists based on the point clouds. Similar to the ISN 1310, the predicted 3D bounding boxes 1316 output by the LSN include information about the dimension, orientation and location of a 3D bounding box for the object in a format that can be projected a same data representation as described below. The predicted 3D set of bounding boxes also include confidence scores for the presence of object class instances within the bounding boxes.

Post-processing is applied to project the predicted 3D boxes 1314 and 1316 onto a same representation. In the system 1300, image data based predicted 3D bounding boxes 1314 are transmitted to post processing 1318. The point cloud based predicted 3D bounding boxes 1316 are transmitted to post processing 1320. As used herein, a representation is a transformation applied to the predicted 3D bounding boxes. The transformation results in an interpretation of the scene in a same format when applied to predicted 3D bounding boxes obtained from a plurality of object detection networks. In an embodiment, a representation is based, at least in part, on a camera angle. In an embodiment, a representation is a probability distribution applied to confidence scores associated with the predicted bounding boxes. For example, a representation can be a front view representation, a bird's-eye view representation, or a heatmap representation. Although particular representations are described, the present techniques are not limited to a single representation for the projections of the predicted 3D bounding boxes. Rather, the present techniques transform the predicted 3D bounding boxes to a same data representation that enables the comparison of a plurality of object detection networks.

Figure 14:
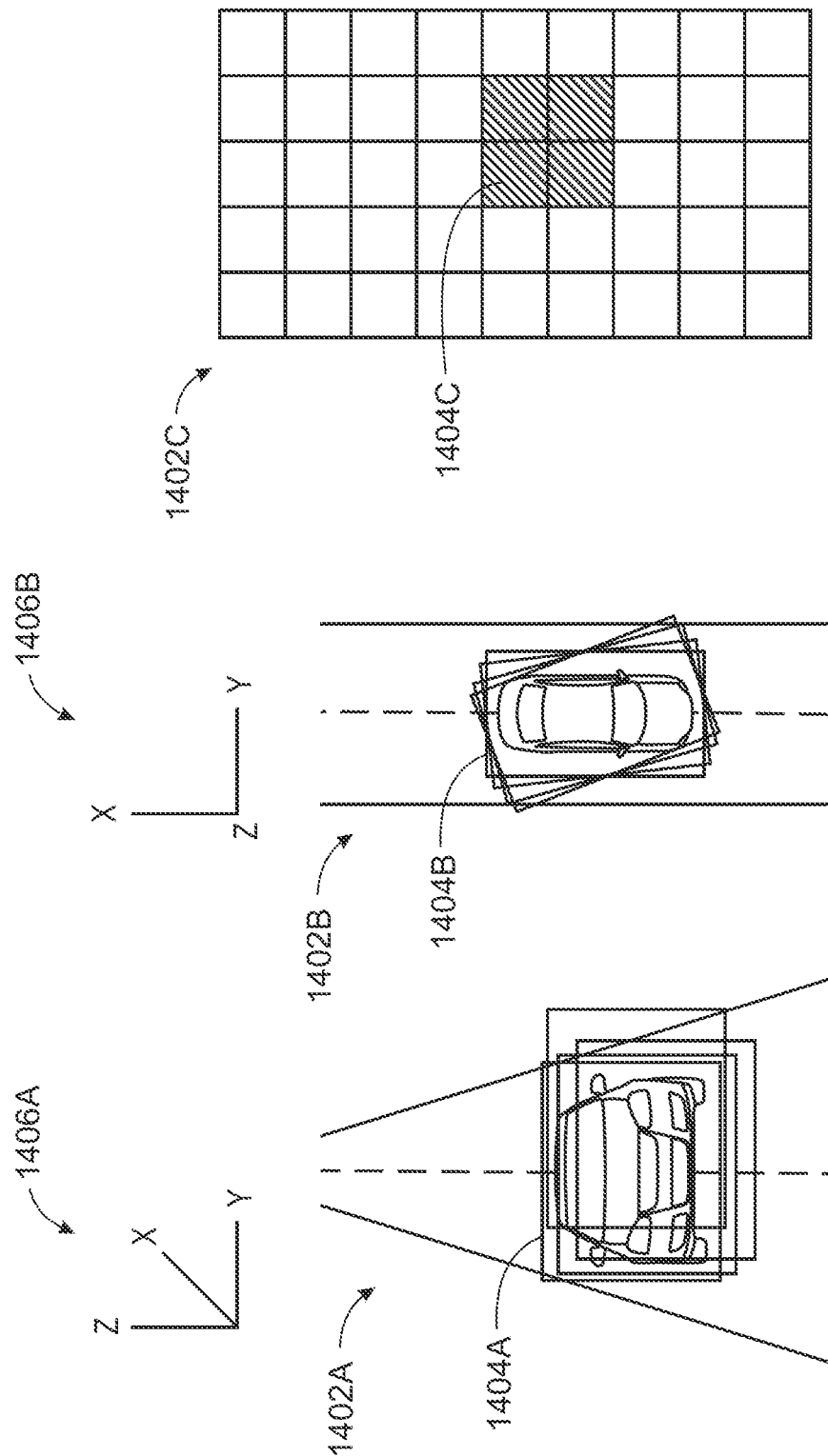
FIG. 14A is a front view representation of an environment.
FIG. 14B is a bird's-eye view representation of an environment.
FIG. 14C is a heatmap representation of the environment as a grid.

In an example, the predicted 3D bounding boxes are projected into a front view representation. A front view representation is view of the bounding boxes projected onto the image plane. FIG. 14A is a front view representation 1400A of an environment 1402A. As illustrated, the front view representation 1400A includes a plurality of projected bounding boxes 1404A. The bounding boxes 1404A are predicted 3D bounding boxes from an object detection network projected onto the front view representation 1400A. In the front view representation, the bounding boxes 1404A are aligned along the x-axis of the coordinates 1406A. Put another way, the bounding boxes do not rotate along the x-axis and have edges that are parallel in the y-z plane.

In an example, the predicted 3D bounding boxes are projected into a bird's-eye view representation. Generally, a bird's-eye view representation is a rendering of the environment projected onto the ground plane. A bird's-eye view eliminates occlusions between detected objects and enables semantically and geometrically consistent relationships between the vehicle and obstacles. FIG. 14B is a bird's-eye view representation 1400B of an environment 1402B. As illustrated, the birds' eye view representation 1400B includes a plurality of bounding boxes 1404B. The bounding boxes 1404B are predicted 3D bounding boxes from an object detection network projected onto the bird's-eye view representation 1400B. In the bird's-eye view representation, the bounding boxes 1404B are not aligned along the z-axis of the coordinates 1406B. Put another way, the bounding boxes rotate along the z-axis and do not have edges that are parallel in the x-y plane. The projected bounding boxes 1404B are non-axis aligned.

In an example, a heatmap representation is generated. The heatmap representation is generated by transforming a bird's eye view representation based on confidence scores. Generally, the heatmap represents a magnitude as a color in two dimensions. The magnitudes are inserted into a matrix with one or more fixed cells. The columns and rows of the heatmap are discrete phenomena and categories. FIG. 14C is a heatmap 1400C of the environment as a grid 1402C. The discrete phenomena and categories represented on the grid 1402C are the classifications of objects detected in the bird's-eye view representation along with confidence scores. In the example of FIG. 14C, each cell represents confidence scores of one or more projected bounding boxes (e.g., bounding boxes 1404B of FIG. 14B) in a bird's-eye view. In an example, the areas for the background without a bounding box are assigned a confidence score of 1.0. Cells of the grid 1402C are differentiated based on the confidence scores the associated projected bounding boxes.

Referring again to FIG. 13, the predicted 3D bounding boxes 1314 and 1316 output by the ISN 1310 and the LSN 1312, respectively, overlap when projected onto a same representation (e.g., overlap in the projected bounding boxes 1404A and 1404B of FIGS. 14A and 14B, respectively).

Accordingly, post processing 1318 and post processing 1320 apply non-maximum suppression to filter redundant projected bounding boxes that belong to the same object. Filtering the redundant projected bounding boxes removes the bounding boxes from a list of proposed bounding boxes. Non-maximum suppression varies according to the selected same representation. As illustrated in FIGS. 14A, 14B, and 14C, the same representation can be front view representation, a bird's-eye view representation, or a heatmap representation. Generally, during object detection confidence scores are created for each bounding box, resulting in many high-scores that are close to one another, thereby generating a large number of predicted 3D bounding boxes that ultimately creates a large number of projected bounding boxes with associated confidence scores in the same representation. Non-maximum suppression suppresses scores that are not the maximum within a local range.

In an embodiment, post-processing 1318 and 1320 include filtering via non-maximum suppression where the intersection over union (IoU) is found for each set of overlapped boxes. The IoU is a ratio between the intersection and union of the projected bounding boxes and a bounding box with a highest confidence score. In an example, a front view representation includes a projected bounding box with a highest confidence score (e.g., box A). Bounding box A is selected and removed from a list of projected bounding boxes (e.g., list of B), and added to a final list of projected bounding boxes (e.g., list of F). The projected list of F is initially empty. Projected bounding box A with the highest confidence score is compared with all remaining projected bounding boxes in the list of B to determine the IoU between the box A and the list of B. If the IoU between A and each B is greater than an IoU threshold, the projected bounding box B is removed from the list of B. The IoU is a predetermined threshold that can tune the strength of the final predicted bounding boxes. The process is iteratively performed until no projected bounding boxes remain in the list of B. In particular, the projected bounding box with the next highest confidence (e.g., next box A) is again selected from the remaining projected bounding boxes (e.g., remaining list of B) and added to the final list of projected bounding boxes F. The IoU of the next box A with the remaining list of B is found, and again the boxes which have an IOU higher than the IoU threshold are removed. This process is repeated until there are no more proposals left in in the remaining list of proposed bounding boxes B. Accordingly, the redundant projected bounding boxes are removed.

In an embodiment, post-processing 1318 and 1320 includes filtering via non-maximum suppression where the IoU calculation is modified due to non-axis aligned bounding boxes (e.g., bounding boxes 1404B of FIG. 14B). In the bird's-eye view representation, projected bounding boxes can be non-axis aligned due to rotations along a z-axis. Non-maximum suppression as applied to the predicted 3D bounding boxes projected to a bird's eye view is modified to account for the rotations that occur.

For example, the modification determines an IoU for convex polygons to account for rotations between the projected bounding boxes. In the modified IoU determination, the proposal with the highest confidence (e.g., box A) is iteratively selected from a list of projected bounding boxes (e.g., list of B) added to the final list of projections (e.g., list F). The IoU of box A with all the proposals in the list of B is found, and again the boxes which have an IoU higher than the IoU threshold are removed. This process is repeated until there are no more proposals left in in the list of projected bounding boxes (B). When determining the IoU between the box A and the bounding boxes in the list of B, all corners of box A that are contained in box B are found. All corners of box B that are contained in box A are found. Intersection points between box A and box B are found, and all points are sorted in a clockwise manner using arctan 2.

In an embodiment, post processing 1318 and post processing 1320 enable post-processing for a heatmap representation. If more than one box is assigned to the same cell of the heatmap, the box with the highest confidence score is selected as the final bounding box associated with that cell. In this manner, the projected bounding boxes that do not satisfy a threshold for the highest confidence score are removed.

Generally, the post processing 1318 and post processing 1320 are configurable based on the same representation used for projection. The output of post processing 1318 and post processing 1320 is a final set of predicted bounding boxes projected onto a same representation and filtered to select the best projected bounding boxes for each sensor modality. The projected bounding boxes are associated with confidence scores that indicate the presence of object class instances within the bounding boxes. The object class instances are used to label the projected bounding box with a particular class. The output of post processing 1318 and post processing 1320 is used for an inconsistency computation 1322. During the inconsistency computation 1322, predictions of the ISN 1310 and LSN 1312 are compared. The comparison is error based or uncertainty based. In an embodiment, the inconsistencies derived from error-based or uncertainty based calculations are weighted in accordance with the known strengths and weaknesses of the respective modality.

In an embodiment, the output of the inconsistency computation 1322 is an active learning score that estimates the inconsistency between sensor modalities. The projected bounding boxes that are inconsistent across modalities are used to determine if the scene is informative. As used herein, a scene refers to a portion of the environment or the entire environment. In an embodiment, the scene refers to a portion of the environment or the entire environment at a particular time instance. Generally, an inconsistency refers to a disagreement in corresponding information between a first sensor modality and a second sensor modality.

The active learning score is used to rank the bounding boxes and the N most informative bounding boxes are selected as informative samples and designated as such within the scene. In some examples, the scene is determined to be an informative scene when the scene includes at least one active learning score that indicates inconsistencies between a same representation across sensor modalities. In an embodiment, a scene is informative when the inconsistencies occur for a portion of the scene above a predetermined threshold. For example, if a number of the calculated inconsistencies is greater than a predetermined threshold, a scene may be labeled as informative and used for training the object detection neural networks. If errors or uncertainties are discovered in more than 25% of the projected bounding boxes, a scene may be labeled as informative. If errors or uncertainties are discovered in projected bounding boxes within a predetermined distance of the vehicle, a scene is labeled as informative. For example, the scene is determined to be an informative scene when a location associated with the calculated inconsistency is within a predetermined distance of the vehicle. An informative scene provides additional or supplemental labeled data from which the object detection network can learn. Additionally, an informative scene provides additional or supplemental labeled data for which an object detection network is known to suffer due to inherent limitations.

Error-based inconsistency computations are expressed as:

$$E(ISN(S_i), LSN(S_j)) \qquad (1)$$

where E is the function to compute the error between the ISN 1310 and the LSN 1312, and $S_i$ and $S_j$ are a set of a first set of projected bounding boxes and a second set of projected bounding boxes. In embodiments, the function E is any one or more statistical classifications. Generally, the predictions of the object detection network for a plurality of modalities are compared. The predictions of an object detection network are the predicted 3D bounding boxes that have been projected to a same representation and post-processed. With respect to the inconsistency computation 1322, the predicted 3D bounding boxes that have been projected to a same representation and post-processed are referred to generally as predictions.

In an error-based inconsistency computation, the predictions of a first object detection network of a sensor modality are labeled as a pseudo-ground truth while the predictions of the remaining object detection network are labeled as predictions. The errors between the pseudo-ground truth and the predictions of the remaining object detection networks are determined. For example, the predictions of the ISN and the LSN are compared, and either the ISN predictions or the LSN predictions are labeled as the pseudo-ground truth, and a number of error types are counted.

The bounding boxes are weighted when computing the error. In embodiments, a bounding box has a higher weight when the bounding box is closer to the vehicle. This gives higher importance to potentially informative scenes when the inconsistent areas occur closer to the vehicle when compared to inconsistent areas that are farther away from the ego vehicle. An exemplary linear weighting function is provided below:

$$\text{weight} = \max\left(0, 1 - \frac{\text{distance}}{100 * 2}\right) \qquad (2)$$

In Equation (2), the distance is computed between the center of a bounding box and a position of the vehicle in a bird's-eye view representation. In an embodiment, no weighting function is applied, and the weight is assigned a value of one for every prediction.

Machine learning statistical measures are implemented to determine error based uncertainties. Machine learning statistical measures include, but are not limited to, false positive false negative (FP+FN), precision, recall, and F1 score, or any combinations thereof. Generally, the machine learning statistical measures are based on a ground truth compared with a prediction. In evaluating the machine learning statistical measures, a false positive (FP) is an error that indicates a condition exists when it actually does not exist. A false negative (FN) is an error that incorrectly indicates that a condition does not exist. A true positive is a correctly indicated positive condition, and a true negative is a correctly indicated negative condition. Accordingly, for a FP+FN statistical measure, a false positive is a prediction that does not have a sufficiently high IOU with any ground truth box. When a confidence score of a detection that is to detect a ground-truth is lower than a predetermined threshold, a false negative occurs. The number of FP+FN errors are counted between the pseudo-ground truth modality predictions and other modality predictions.

Generally, the precision is the number of true positives divided by the sum of true positives and false positives. Subtracting the precision from one results in an active learning score where the higher the precision, the lower the resulting inconsistency. A lower inconsistency computation indicates that the associated projections are consistent. Similarly, the recall is the number of true positives divided by the sum of true positives and false positives. Subtracting the recall from one results in an active learning score where the higher the recall, the lower the inconsistency computation. An F1 score is a balanced F-score and is the harmonic mean of precision and recall. In an embodiment, the F1 score is a measure of accuracy. Accuracy is the probability that a randomly chosen instance (positive or negative, relevant or irrelevant) will be correct. Similar to the precision and recall statistical measures, subtracting the F1 score from one results in an active learning score where the higher the F1 score, the lower the inconsistency computation. A lower inconsistency computation indicates the associated projections are consistent across modalities. In an example, a predetermined threshold is applied to the active learning score. In an example, if the score is above 0.5, the associated projections are determined to be inconsistent. To account for relationships across the full range of the confidence scores, an uncertainty based inconsistency computation is applied. Generally, the uncertainty based inconsistency computation computes a cross-modal inconsistency with probability distributions of each true positive pair from each object detection network. The uncertainty based inconsistency computations can be further divided two sub-groups: bounding box and heatmap.

In an example, a first uncertainty based inconsistency computation computes a JS-divergence between each true positive pair. The Jensen-Shannon (JS) divergence measures the similarity between two probability distributions, such as those associated with bounding boxes. The JS-divergence is symmetric and always has a finite value. In embodiments, a maximum value is assigned to each false positive and false negative. In an example, the maximum value is 1.0.

Alternatively, when the predicted 3D bounding boxes are mapped to a heatmap representation (probability map) an active learning score is computed using mutual information (MI). Generally, mutual information is a measure of the mutual dependence between two variables. In an embodiment, the two variables are two heatmaps. Mutual information quantifies the amount of information obtained about one random variable through observing the other random variable. The probabilities from two heatmaps in a class are averaged. In particular, mutual information for each cell by is computed by the following equation:

$$p(i) = \tfrac{1}{2}(h_{ISN}(i) + h_{LSN}(i)) \qquad (3)$$

Mutual information is computed for each cell as follows:

$$MI(i) = H(p(i)) - \tfrac{1}{2}(H(h_{ISN}(i)) + H(h_{LSN}(i))) \qquad (4)$$

where H represents an entropy function. Lastly, the final mutual information of a heatmap is calculated as:

$$MI = \Sigma_{i-1}^{I} MI(i) \qquad (5)$$

where I represents the total number of cells in a heatmap.

The block diagram of FIG. 13 is not intended to indicate that the active learning as described herein is to include all of the components shown in FIG. 13. Rather, the cross-modality active learning can include fewer or additional components not illustrated in FIG. 13 (e.g., additional modalities, detection networks, post-processing, inconsistency computations, etc.). The active learning may include any number of additional components not shown, depending on the details of the specific implementation. Furthermore, any of the ISN, LSN, post processing, inconsistency computations, and other described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

The block diagrams of FIGS. 14A, 14B, and 14C are not intended to indicate that the representations as described herein is to include all of the components shown in FIGS. 14A, 14B, and 14C. Rather, the representations can include fewer or additional components not illustrated in FIGS. 14A, 14B, and 14C (e.g., objects, object classes, bounding boxes, etc.). The representations include any number of additional components not shown, depending on the details of the specific implementation. Furthermore, any of the described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Process for Cross Modality Active Learning

Figure 15:
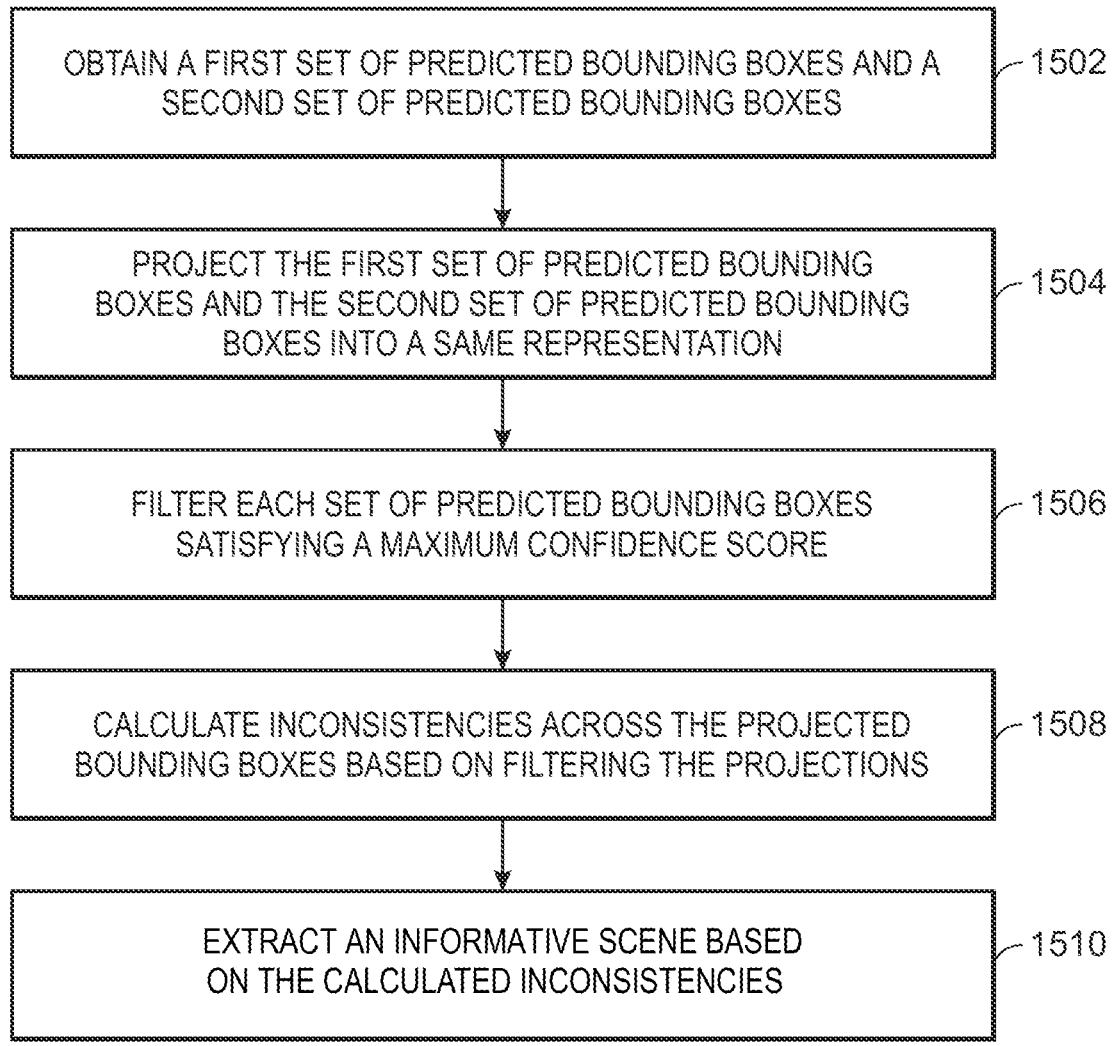
FIG. 15 is a process flow diagram of a process 1500 for cross-modality active learning for object detection.

FIG. 15 is a process flow diagram of a process 1500 for cross-modality active learning for object detection. At block 1502, a first set of predicted bounding boxes and a second set of predicted bounding boxes are obtained. The predicted bounding boxes are generated by a respective sensor (e.g., sensors 121 of FIG. 1) that is communicatively coupled with an object detection neural network (e.g., ISN 1310, LSN 1312). Accordingly, a first sensor (e.g., camera 1302 of FIG. 13) is communicatively coupled with a first object detection neural network (e.g., ISN 1310 of FIG. 13) that generates a first set of predicted bounding boxes (e.g., predicted 3D boxes 1314 of FIG. 13). Additionally, a second sensor (e.g., LiDARs 1304 of FIG. 13) is communicatively coupled with a second object detection neural network (e.g., LSN 1312 of FIG. 13) that generates a second set of predicted bounding boxes (e.g., predicted 3D boxes 1316 of FIG. 13). Each respective bounding box of the first set of predicted bounding boxes and the second set of predicted bounding boxes is assigned a confidence score indicating the presence of an object class instance within the respective predicted bounding box.

At block 1504, the first set of predicted bounding boxes and the second set of predicted bounding boxes are projected into a same representation (e.g., front view representation 1400A of FIG. 14A, bird's-eye view representation 1400B of FIG. 14B, or a heatmap representation 1400C of FIG. 14C). The projection of the predicted bounding boxes onto a same representation is performed during post-processing (e.g., post-processing 1318 and post-processing 1320 of FIG. 13).

At block 1506, the projections are filtered, wherein predicted bounding boxes satisfy a maximum confidence score are selected for inconsistency calculations. In an embodiment, the filtering is non-maximum suppression that is adapted based on a type of the same representation. Put another way, the form of non-maximum suppression can change based on the same representation to which the bounding boxes are projected. For example, for a front view representation, filtering via non-maximum suppression includes determining an intersection of union between each set of overlapped bounding boxes, and a bounding box with a maximum confidence score is selected as a final score. In another example, filtering via non-maximum suppression for a bird's-eye view includes determining an intersection of union between each set of overlapped bounding boxes, where the IoU calculation is modified to determine the intersection of convex polygons to account for rotations between the predicted boxes when projected to a bird's-eye view representation. A bounding box with a maximum confidence score is selected as a final score. In another example, filtering via non-maximum suppression is applied to a heatmap representation. For example, when more than one predicted bounding box is assigned to the same cell of the heatmap, the box with the highest confidence score is selected as the final bounding box associated with that cell.

At block 1508, inconsistencies are calculated across the filtered, projected bounding boxes based on filtering the projections. The inconsistency computations (e.g., 1322 of FIG. 13) are error-based, uncertainty-based, or any combinations thereof. The inconsistencies are used to derive an active learning score. At block 1510, an extracted scene is an informative scene based on the calculated inconsistencies. For example, a scene is informative when the scene includes at least one active learning score that indicates inconsistencies between a same representation across sensor modalities. In an embodiment, a scene is informative when the inconsistencies occur for a portion of the scene above a predetermined threshold. For example, if errors or uncertainties are discovered in more than 25% of the projected bounding boxes, a scene may be labeled as informative. If errors or uncertainties are discovered in projected bounding boxes within a predetermined distance of the vehicle, a scene may be labeled as informative. By determining if the scene is informative, only meaningful data is stored, thereby preventing the need to store all recorded data. As a result, the present techniques are operable within a limited storage space. Due to the reduction in storage space, the present techniques are executed on the vehicle.

Annotated scenes are used in machine learning to train models and increase awareness of various environments. Annotations are often done by human operators, which is costly and is subject to human biases and error. Generally, the more exposure machine learning models have to labeled data sets, the more robust and complete the models become. The present techniques reduce an annotation budget by selecting and annotating interesting data based on model understanding. In embodiments, the present techniques mine raw data from logs by given a set of images and point clouds instead of a single input modality.

The ability to automatically filter meaningless data creates a more efficient system with adequate storage ability, as all data is not required to be stored. Each object detection network uses active learning to select the data used to learn, enabling the core machine learning algorithms of the object detection network to reach high levels of accuracy.

The process flow diagram of FIG. 15 is not intended to indicate that the blocks of the example process 1500 are to be executed in any order, or that all of the blocks are to be included in every case. Further, any number of additional blocks not shown may be included within the example process 1500, depending on the details of the specific implementation.

In the foregoing description, embodiments of the invention have been described with reference to numerous specific details that may vary from implementation to implementation. The description and drawings are, accordingly, to be regarded in an illustrative rather than a restrictive sense.

The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    generating, by a processor, a first set of predicted bounding boxes based on images from an image sensor and a second set of predicted bounding boxes based on a point cloud from a LiDAR sensor, wherein a respective predicted bounding box of the first set of predicted bounding boxes and the second set of predicted bounding boxes is assigned a classification score indicating a presence of an object class instance within the respective predicted bounding box;
    projecting, by the processor, the first set of predicted bounding boxes and the second set of predicted bounding boxes into a same representation;
    filtering, by the processor, the projections wherein a first subset of predicted bounding boxes satisfying a maximum confidence score is selected from the first set of predicted bounding boxes and a second subset of predicted bounding boxes satisfying the maximum confidence score is selected from the second set of predicted bounding boxes;
    calculating, by the processor, inconsistencies between the first subset of predicted bounding boxes associated with the images from the image sensor and the second subset of predicted bounding boxes associated with the point cloud from the LiDAR sensor based on filtering the projections;
    extracting, by the processor, an informative scene based on the calculated inconsistencies; and
    training, by the processor, a first object detection neural network or a second object detection neural network using the informative scene.

2. The method of claim 1, further comprising extracting the informative scene when the number of the calculated inconsistencies is greater than a predetermined threshold.

3. The method of claim 1, further comprising assigning a weight to each predicted bounding box in the first subset and the second subset according to a distance of each projected bounding box from a vehicle.

4. The method of claim 1, wherein the same representation is one of a front view representation, bird's-eye view representation, or heatmap representation.

5. The method of claim 1, further comprising:
    projecting the first set of predicted bounding boxes and the second set of predicted bounding boxes into a same front view representation;
    filtering the projections using non-maximum suppression to eliminate redundant projections that belong to the same object; and
    calculating inconsistencies in confidence scores of the filtered projection via an error based inconsistency calculation.

6. The method of claim 1, further comprising:
    projecting the first set of predicted bounding boxes and the second set of predicted bounding boxes into a same bird's-eye view representation;
    filtering the projections using non-maximum suppression with a modified intersection over union for convex polygons to eliminate redundant projections that belong to the same object; and
    calculating inconsistencies in confidence scores of the filtered projection via an error based inconsistency calculation.

7. The method of claim 1, further comprising:
    projecting the first set of predicted bounding boxes and the second set of predicted bounding boxes into a same heatmap representation;
    filtering the projections by selecting a highest confidence score of a plurality of bounding boxes assigned a cell of the heatmap representation; and
    calculating inconsistencies in confidence scores of the filtered projection via an error based inconsistency calculation.

8. The method of claim 1, further comprising:
    projecting the first set of predicted bounding boxes and the second set of predicted bounding boxes into a same front view representation;
    filtering the projections using non-maximum suppression to eliminate redundant projections that belong to the same object; and
    calculating inconsistencies in confidence scores of the filtered projection via an uncertainty based inconsistency calculation.

9. The method of claim 1, further comprising:
    projecting the first set of predicted bounding boxes and the second set of predicted bounding boxes into a same bird's-eye view representation;
    filtering the projections using non-maximum suppression with a modified intersection over union for convex polygons to eliminate redundant projections that belong to the same object; and
    calculating inconsistencies in confidence scores of the filtered projection via an uncertainty based inconsistency calculation.

10. The method of claim 1, further comprising extracting the informative scene when a location associated with the calculated inconsistencies is within a predetermined distance of a vehicle.

11. A non-transitory computer-readable storage medium comprising at least one program for execution by at least one processor of a first device, the at least one program including instructions which, when executed by the at least one processor, carry out a method comprising:
    generating a first set of predicted bounding boxes based on images from an image sensor and a second set of predicted bounding boxes based on a point cloud from a LiDAR sensor, wherein a respective predicted bounding box of the first set of predicted bounding boxes and the second set of predicted bounding boxes is assigned a classification score indicating a presence of an object class instance within the respective predicted bounding box;
    projecting the first set of predicted bounding boxes and the second set of predicted bounding boxes into a same representation;
    filtering the projections wherein a first subset of predicted bounding boxes satisfying a maximum confidence score is selected from the first set of predicted bounding boxes and a second subset of predicted bounding boxes satisfying the maximum confidence score is selected from the second set of predicted bounding boxes;

calculating inconsistencies between the first subset of predicted bounding boxes associated with the images from the image sensor and the second subset of predicted bounding boxes associated with the point cloud from the LiDAR sensor based on filtering the projections;

extracting an informative scene based on the calculated inconsistencies; and training a first object detection neural network or a second object detection neural network using the informative scene.

12. The non-transitory computer-readable storage medium of claim 11, further comprising extracting the informative scene when the number of the calculated inconsistencies is greater than a predetermined threshold.

13. The non-transitory computer-readable storage medium of claim 11, further comprising assigning a weight to each predicted bounding box in the first subset and the second subset according to a distance of each projected bounding box from a vehicle.

14. The non-transitory computer-readable storage medium of claim 11, wherein the same representation is one of a front view representation, bird's-eye view representation, or heatmap representation.

15. A vehicle, comprising:
at least two sensors comprising an image sensor and a LiDAR sensor, wherein the image sensor is communicatively coupled with a first object detection neural network that generates a first set of predicted bounding boxes based on images from the image sensor and the LiDAR sensor is communicatively coupled with a second object detection neural network that generates a second set of predicted bounding boxes based on a point cloud from the LiDAR sensor, wherein respective predicted bounding box of the first set of predicted bounding boxes and the second set of predicted bounding boxes is assigned a classification score indicating a presence of an object class instance within the respective predicted bounding box;

at least one computer-readable medium storing computer-executable instructions;

at least one processor communicatively coupled to the image sensor and the LiDAR sensor and configured to execute the computer-executable instructions, the execution carrying out operations including:

projecting the first set of predicted bounding boxes and the second set of predicted bounding boxes into a same representation;

filtering the projections wherein a first subset of predicted bounding boxes satisfying a maximum confidence score is selected from the first set of predicted bounding boxes and a second subset of predicted bounding boxes satisfying the maximum confidence score is selected from the second set of predicted bounding boxes;

calculating inconsistencies between the first subset of predicted bounding boxes associated with the images from the image sensor and the second subset of predicted bounding boxes associated with the point cloud from the LiDAR sensor based on filtering the projections;

extracting an informative scene based on the calculated inconsistencies; and training the first object detection neural network or the second object detection neural network using the informative scene.

16. The vehicle of claim 15, wherein the operations further comprise that the informative scene is extracted when the number of the calculated inconsistencies is greater than a predetermined threshold.

17. The vehicle of claim 15, wherein the same representation is one of a front view representation, bird's-eye view representation, or heatmap representation.

18. The vehicle of claim 15, wherein the first object detection neural network is an image semantic segmentation network and the second object detection neural network is a LiDAR semantic segmentation network.

19. The vehicle of claim 15, the operations further comprising assigning a weight to each predicted bounding box in the first subset and the second subset according to a distance of each projected bounding box from the vehicle.

* * * * *